No. 676,850. Patented June 18, 1901.
W. H. SAUVAGE.
AIR BRAKE MECHANISM.
(Application filed June 5, 1900.)
(No Model.) 2 Sheets—Sheet 1.
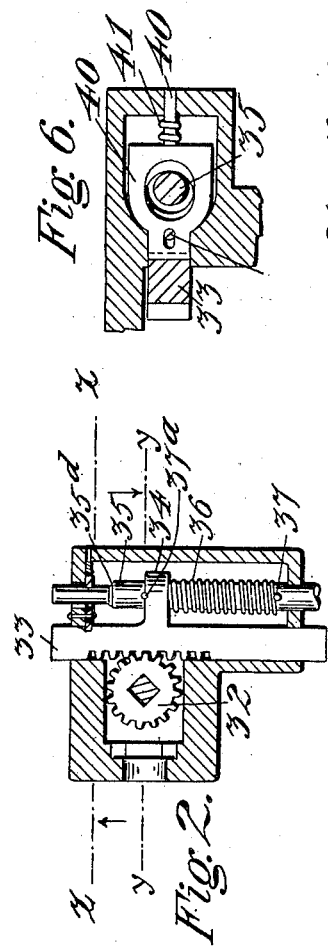
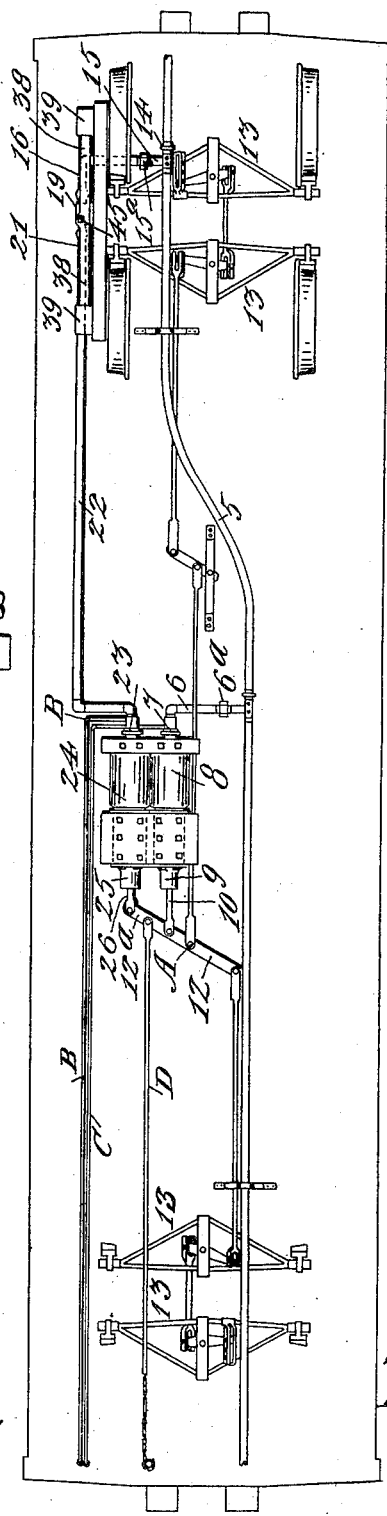
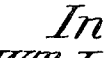
Witnesses,
H. M. Neff
Grace Mytinger
Inventor,
Wm. H. Sauvage,
By
Attorney.

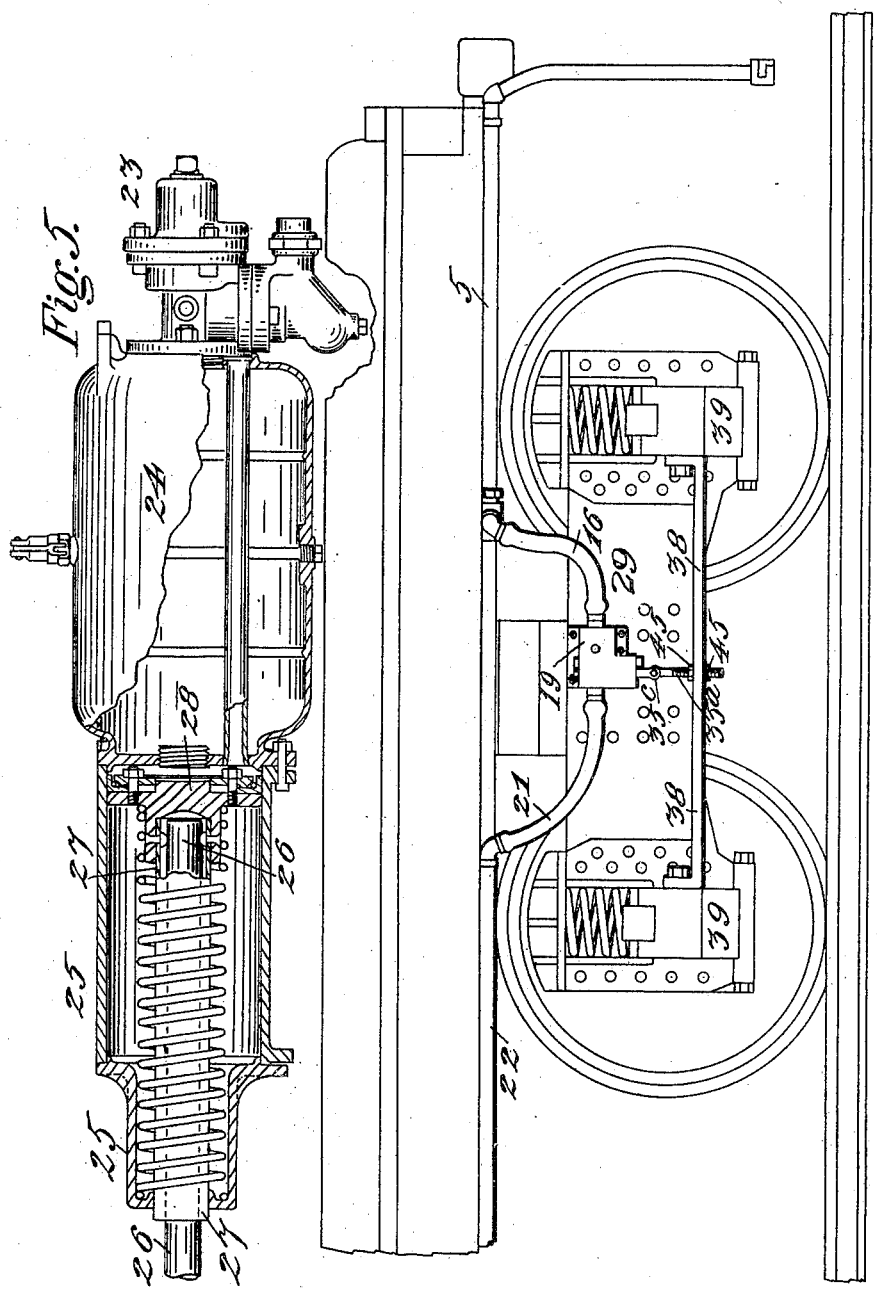

UNITED STATES PATENT OFFICE.

WILLIAM HENRY SAUVAGE, OF DENVER, COLORADO, ASSIGNOR, BY DIRECT AND MESNE ASSIGNMENTS, TO THE SAUVAGE DUPLEX AIR BRAKE COMPANY, OF SAME PLACE.

AIR-BRAKE MECHANISM.

SPECIFICATION forming part of Letters Patent No. 676,850, dated June 18, 1901.

Application filed June 5, 1900. Serial No. 19,186. (No model.)

*To all whom it may concern:*

Be it known that I, WILLIAM HENRY SAUVAGE, a citizen of the United States of America, residing at Denver, in the county of Arapahoe and State of Colorado, have invented certain new and useful Improvements in Air-Brake Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in air-brake mechanism.

The invention is specially intended for use on freight-cars, its object being to regulate the braking force applied to the wheels of the car, so that said force shall be properly proportionate to the weight of the loaded car.

The air-brake system now generally in use is satisfactory for passenger-car service, because there is comparatively little difference in the weight of a passenger-car whether it is loaded or not; but the present system is not satisfactory for freight-car service, because the load is a very important item, and a braking force which would be sufficient or desirable for a loaded car would slide the wheels of an empty car. The sliding of the wheels wears them flat at the portion of the tread in contact with the rails and renders them unfit for use. Hence a high authority of this subject makes the following statement: "It is of the utmost importance that the braking force applied to the wheels of a car should be proportionate to the weight of the same. A braking force applied to the wheels equal to the weight that is pressing them against the rail, thus balancing their adhesion to the track, will cause them to slide." The foregoing is taken from the "Instruction Book" of the Westinghouse Air Brake Company.

In the Westinghouse air-brake system provision is made for using a braking force equal to seventy per cent. of the weight of the empty freight-car; but when the car is loaded no automatic provision is made or can be made by the appliances in use for an extra braking force. The object of my invention is to overcome this difficulty, and my improvements embody means whereby when the car is loaded the extra weight on the spring-supported car-body depresses the latter sufficiently to open a valve, whereby communication is effected between the train-brake pipe and a pipe leading to the triple valve of an extra auxiliary reservoir and brake-cylinder, the push-rod of the brake-cylinder being connected with the brake-lever in such a manner that an extra braking force proportionate to the increased weight given by the load may be applied to the wheels. When, however, the load is removed and the car is empty, the said valve is automatically closed, thus cutting off the extra brake mechanism from use, whereby only ordinary brake mechanism adapted for the empty car is utilized.

Having stated the objects of the invention and having briefly referred to the construction whereby I attain these objects, I will proceed to describe my improvements in detail, reference being made to the accompanying drawings, in which is illustrated an embodiment thereof.

In the drawings, Figure 1 is an underneath view of a car, showing my improvements in connection with the mechanism of the Westinghouse air-brake system. Fig. 2 illustrates the mechanism for automatically operating the valve which opens or closes communication with the extra brake mechanism as occasion may require. This view is a section taken on the line X X, Fig. 3. Fig. 3 is a section taken through the valve mechanism on the line Y Y, Fig. 2. In Figs. 2 and 3 the parts are shown on an enlarged scale as compared with Fig. 1. Fig. 4 is a side elevation of a metal truck equipped with my improved automatically-controlled valve. Fig. 5 is a side elevation, partly in section, of the triple valve, auxiliary reservoir, and brake-cylinder of the Westinghouse air-brake system. Fig. 6 is a section taken on the line Z Z, Fig. 2, the parts being shown on a larger scale.

The same reference characters indicate the same parts in all the views.

Let the numeral 5 designate the train-brake pipe through which the air passes from the main reservoir (not shown) of the Westinghouse air-brake system. From the train-pipe leads a branch pipe 6 to the triple valve 7 of the auxiliary reservoir 8, connected with the brake-cylinder 9, whose push-rod 10 is connected with the brake-lever 12, the latter being connected with the brake-beams 13 by a system of connecting-rods and levers of ordinary or any suitable construction. These features need not be further described, as they have nothing to do with my improvements, which will now be set forth in detail.

Connected with the train-brake pipe 5 at 14 is a branch pipe 15, which leads to one extremity of a flexible hose-pipe 16, whose opposite extremity is connected with the inlet-pipe 17 of a valve-chamber 18, inclosed by a casing 19. This valve-chamber is provided with an outlet-pipe 20, with which a flexible hose part 21 is connected. The opposite extremity of the hose part 21 is connected with a pipe 22, which leads to the triple valve 23 of an auxiliary reservoir 24, connected with a brake-cylinder 25, whose push-rod 26 leads to an extension 12$^a$ of the brake-lever 12. The parts 23, 24, 25, and 26 are substantially of the same construction as the parts 7, 8, 9, and 10 and designated as the "triple valve," the "auxiliary reservoir," the "brake-cylinder," and the "push-rod," respectively, of the Westinghouse air-brake system for freight-car equipment. This construction will not be described in detail except so far as to make it plain that the push-rod 26 may act independently of the brake-cylinder piston. This is of course necessary, since when my improvement is not in use the push-rod 10 will operate the lever 12 in the ordinary manner, in which event the push-rod 26 will vibrate or reciprocate idly. This mechanism is illustrated in Fig. 5, from an inspection of which it will be observed that the push-rod 26 is inserted in the hollow piston-rod 27 of the brake-cylinder piston 28.

The valve-casing 19 is mounted on a truck-frame 29 by means of suitable fastening devices, as bolts. The valve 30 is provided with an opening 31, adapted to register with the inlet and outlet pipes 17 and 20 when the valve is open. To one extremity of this valve is made fast a gear or pinion 32, whose cogs are engaged by a vertical rack 33, passing through the valve-casing and provided with an apertured lug or eye 34, through which passes a rod 35, surrounded by a coil-spring 36, one extremity of which bears against the eye of the rack, while the other extremity engages a stop-pin 37, fast on the rod. This rod passes through the valve-casing, and its lower extremity is provided with a threaded extension 35$^a$, connected with the main rod by a joint 35$^c$, to allow the necessary movement when the wheels are passing over uneven portions of the track. This extension 35$^a$ passes through an unthreaded opening in a bar 38, whose extremities are made fast to the journal-boxes 39 or other suitable support which is relatively stationary when the car-body and truck vibrate vertically or move upward and downward. A nut 45 is applied to the threaded extension 35$^a$ on each side of the bar 38, whereby the rod 35 may be adjusted vertically. The upper extremity of this rod passes through an opening formed in a latch-dog 40 and through an opening in the upper part of the valve-casing. The latch bolt or dog 40 is adapted to enter a recess formed in the rack 35. This dog is mounted on the casing 19, and its stem is surrounded by a spring 41, one extremity of which engages the body of the dog, while the other extremity bears against the casing. By means of this dog the rack 33 is locked on the casing and made to vibrate with the body of the car. The rod 35, however, is provided with a beveled shoulder 35$^d$, which as the valve-casing moves downward with the truck-frame and the body of the car in response to the weight of the load engages a bevel on the dog and opens the latter, thus releasing the rack 33. The spring 36, which has been compressed by the downward movement of the rack, recoils as soon as the rack is released and forces the rack upward sufficiently to open the valve 30 through the instrumentality of the pinion 32, which is turned sufficiently to bring the valve-opening 31 into line with the opposite ports of the valve-chamber. By this arrangement the valve is opened wide instantly as soon as the weight of the load has depressed the car-body and truck-frame sufficiently to bring the latch-dog 40 into engagement with the beveled shoulder of the rod 35, which being mounted on a relatively stationary support does not vibrate with the spring-supported car-body and truck-frame. From the construction heretofore described it is evident that by means of the nuts 45 the rod 35 may be adjusted vertically to cause it to engage and open the latch-dog 40 when the body of the car and truck-frame have been depressed to the desired degree. Hence this rod may be so adjusted that the valve will be opened in response to the weight of any load which it may be desired to place upon the car, whether it be great or small. A stop-pin 37$^a$, attached to the rod 35, engages the eye 34 of the rack from above.

From the foregoing description the operation of my improved apparatus will be readily understood. When the car is empty, the ordinary brake mechanism operates in the usual manner. As the lever 12 moves the push-rod 26 reciprocates idly in the hollow stem 27 of the piston 28. In this case the valve 30 remains closed and no air passes to the auxiliary reservoir 24 or the brake-cylinder 25. When, however, the car is loaded to the required capacity, its body and the truck-frame are depressed sufficiently to open the valve 30 of the casing 9 in the manner heretofore explained. In this event the air passes freely to the auxiliary reservoir 25 by way of the branch pipe 15, the auxiliary hose part 16, the valve 30, the hose part 21, the pipe 22, and the triple valve 23 in the same manner as it passes to the auxiliary reservoir 8 by way of the train-pipe 5, branch pipe 6, and triple valve 7, the only difference being that both auxiliary reservoirs are charged and both brake-cylinders instead of one ready for action. In this case when the engineer desires to make either an ordinary service stop or an emergency stop, as the case may be, both push-rods 10 and 26 are forced out of their brake-cylinders and act on the brake-lever 12 in applying the brake. As shown in the drawings, the push-rod 26 is connected with the lever 12 about three times as far from the fulcrum-point A as the push-rod 10. Hence the braking power or force exerted by the push-rod 26 will be correspondingly greater than the power exerted by the rod 10 or about three times as great. Of course this may be regulated as desired.

In practice the auxiliary reservoir 24 and the brake-cylinder 25 should preferably be made somewhat larger than the ordinary parts 8 and 9 of the regular system, for the reason that the travel of the push-rod 26 is, by reason of its greater distance from the fulcrum-point, greater than the travel of the push-rod 10, and in some cases the ordinary length of brake-cylinder might not be sufficient to allow the push-rod 28 the required stroke. In Fig. 1, however, the parts 24 and 25 are shown of the same size as the parts 8 and 9.

When the load is removed from the car, its body portion and truck-frame will move upwardly to their normal position, whereby the movement of the valve 30 may be reversed and the rack 33 returned to its normal position, when the latch-dog 20 will reëngage the rack and again lock the valve in the closed position. It will thus be seen that the opening and closing of the valve is entirely automatic and occasioned by the vertical vibration or upward-and-downward movement of the car-body, which movement is dependent upon the weight of the load. The branch pipe 15 is provided with a cut-out cock 15ª, the same as the cock 6ª of the regular system. There is also a pipe B leading from the triple valve 23 to a pressure-retaining valve (not shown) at the top of the car, the same as the pipe C, leading from the triple valve 6 to the pressure-retaining valve (not shown) of the regular system. The hand-brake rod is connected with the lever 12 in the usual manner.

It must be understood that I do not limit the invention to the details of construction herein shown, as I am aware that many modifications may be employed without departing from the spirit of the invention.

The valve-operating mechanism shown in detail in Figs. 2, 3, and 6 is not broadly claimed herein, since it is covered by a simultaneously-pending application, filed June 5, 1900, Serial No. 19,187.

Having thus described my invention, what I claim is—

1. In an air-brake system, the combination with a brake-lever and a set of brake mechanism connected therewith, of auxiliary brake mechanism connected with the same lever but at a different point, an air-pipe connected with the auxiliary mechanism, a valve mounted to vibrate with the spring-supported car-body, connected to control the passage of air through said pipe, and a device mounted on a part stationary with reference to the car-body and arranged to act directly on said valve whereby the latter is operated by the vertical movement of the car-body.

2. In an air-brake system, the combination with a suitable brake mechanism, and a pipe or conduit connected therewith and communicating with a source of compressed air, of a valve for controlling the passage of air through said pipe, said valve being mounted to vibrate with the car-body and provided with a pinion and means for opening the valve as the car-body is depressed by the weight of the load, said means being mounted on a relatively stationary part of the car and provided with a cogged rack engaging the pinion of the valve, the valve and its operating means being so arranged that one of them is mounted on the truck-frame and the other upon a relatively stationary part of the car.

3. In an air-brake system, the combination with suitable brake mechanism and a pipe connected therewith and communicating with a source of compressed air, of a valve mounted on a vertically-movable part of the car, and provided with a pinion, a flexible connection between the air-pipe and the valve-chamber, and a cogged rack mounted on a stationary part of the car and arranged to engage the pinion and open said valve as the car-body moves downwardly in response to the weight of the load.

4. In an air-brake system, the combination with suitable brake mechanism and a pipe connected therewith and communicating with a source of compressed air, of a valve mounted to vibrate with the spring-supported car-body and arranged to control the passage of air through the said pipe to the brake mechanism, a jointed device mounted on a part of the car stationary with reference to the car-body, for opening said valve as the car-body moves downwardly in response to the weight of the load.

5. In an air-brake system, the combination with brake mechanism having a braking force suitable for an empty car, of auxiliary brake mechanism, a pipe connected therewith and supplied with air from a suitable source, a valve mounted on the truck-frame, and arranged to be opened by the downward movement of the car-body incident to the weight of the load, whereby the combined braking force of the two sets of mechanism may be utilized on the loaded car.

6. In an air-brake system, the combination of a set of brake mechanism and a train-pipe leading thereto from a source of air, of an auxiliary set of brake mechanism, an air-pipe connected with the train-brake pipe and leading to the auxiliary mechanism, and a valve for controlling the passage of air through the pipe connected with the auxiliary brake mechanism, said valve being mounted on the truck-frame and arranged to be opened by the downward movement of the car incident to the gravity of the load.

7. In an air-brake system, the combination with brake mechanism and an air-pipe connected therewith and leading from a source of compressed air, of a valve mounted on the car-truck frame, a flexible connection between the air-pipe and the valve-chamber whereby the air is allowed to pass from said pipe to said chamber, and means supported from the journal-boxes of the wheels for operating said valve as the car-body vibrates vertically.

8. In an air-brake system, the combination with brake mechanism and an air-pipe connected therewith and leading from a source of compressed air, of a valve mounted on the car-truck frame, a flexible connection between the air-pipe and the valve-chamber whereby the air is allowed to pass from said pipe to said chamber, a pinion fast on the valve-stem, a rack engaging the pinion and provided with an apertured lug, a latch-dog arranged to lock the rack on the valve-casing, a rod supported from the journal-boxes of the wheels and passing through the opening in the lug of the rack and through the valve-casing, a stop attached to the rod above the lug, a spring surrounding the rod below the lug and engaging a stop on the rod, the latter being arranged to open the valve and unlock the rack when the valve-casing has moved downwardly a predetermined distance, allowing the spring to act on the rack and open the valve.

9. In an air-brake system, the combination of a brake mechanism, an air-pipe connected therewith and leading from a source of compressed air, a casing fast on the car-truck frame intermediate the wheels, a valve located in said casing, a suitable connection between the air-pipe and the valve-chamber, a bar connected with the journal-boxes between the car-wheels, a jointed rod mounted on the said bar and passing through the valve-casing, and a suitable connection between the rod and the valve whereby as the car-body and truck-frame move downwardly a predetermined distance, the valve is opened.

In testimony whereof I affix my signature in presence of two witnesses.

WILLIAM HENRY SAUVAGE.

Witnesses:
   A. J. O'BRIEN,
   GRACE MYTINGER.